United States Patent
Haruta et al.

(10) Patent No.: US 6,774,065 B2
(45) Date of Patent: Aug. 10, 2004

(54) WATERPROOF-FINISHED FABRIC AND WATERPROOF CLOTHING

(75) Inventors: Masaru Haruta, Shiga (JP); Hiroshi Kagao, Osaka (JP); Yuichi Manabe, Osaka (JP); Masanori Uemoto, Kyoto (JP); Takenori Furuya, Kyoto (JP)

(73) Assignee: Toray Industries, Inc. (JP)

( * ) Notice: Subject to any disclaimer, the term of this patent is extended or adjusted under 35 U.S.C. 154(b) by 74 days.

(21) Appl. No.: 10/089,768

(22) PCT Filed: Aug. 3, 2001

(86) PCT No.: PCT/JP01/06681

§ 371 (c)(1),
(2), (4) Date: Apr. 2, 2002

(87) PCT Pub. No.: WO02/12617

PCT Pub. Date: Feb. 14, 2002

(65) Prior Publication Data

US 2002/0193024 A1 Dec. 19, 2002

(30) Foreign Application Priority Data

| Aug. 9, 2000 | (JP) | 2000-240935 |
| Aug. 9, 2000 | (JP) | 2000-240936 |
| Aug. 9, 2000 | (JP) | 2000-240944 |
| Mar. 23, 2001 | (JP) | 2001-84105 |

(51) Int. Cl.⁷ .......................... B32B 33/00
(52) U.S. Cl. ............ 442/227; 428/40.1; 428/40.2; 428/42.1; 428/66.5; 428/103; 428/141; 428/142; 428/144; 428/147; 428/160; 428/194; 428/198; 428/200; 428/205; 428/206; 428/304.4; 428/308.4; 428/315.5; 428/318.4; 428/319.6; 428/343; 428/346; 428/347; 428/349; 428/354; 428/355 N; 442/65; 442/72; 442/73; 442/74; 442/75; 442/76; 442/79; 442/85; 442/89; 442/149; 442/150; 442/226; 442/286; 442/294; 442/299

(58) Field of Search ............. 428/40.1, 40.2, 428/42.1, 66.5, 103, 141, 142, 143, 144, 147, 160, 194, 198, 200, 205, 206, 304.4, 308.4, 315.5, 318.4, 318.6, 319.3, 343, 346, 347, 349, 354, 355 N; 442/65, 72, 73, 74, 75, 76, 79, 85, 89, 149, 150, 226, 227, 286, 294, 299, 86, 393, 394

(56) References Cited

U.S. PATENT DOCUMENTS 4,429,000 A * 1/1984 Naka et al. ............ 442/63

FOREIGN PATENT DOCUMENTS

| GB | 2316341 A | 2/1998 |
| JP | 62-233237 | 10/1987 |
| JP | 64-45195 | 3/1989 |
| JP | 3-56541 | 8/1991 |
| JP | 5-33335 | 8/1993 |
| JP | 05-321148 | 12/1993 |
| JP | 06-316871 | 11/1994 |
| JP | 07-048779 | 2/1995 |
| JP | 10-219568 | 8/1998 |

* cited by examiner

Primary Examiner—Arti R. Singh
(74) Attorney, Agent, or Firm—Piper Rudnick LLP

(57) ABSTRACT

A waterproofed fabric and a sealing tape for a waterproofed fabric each include a waterproof layer, a resin composition containing spherical particles with a specified particle size laminated to the waterproof layer. A waterproof article of clothing uses the fabric and the sealing tape. The article has a waterproof property, is very comfortable to wear, inexpensive, and light in weight.

25 Claims, No Drawings

WATERPROOF-FINISHED FABRIC AND WATERPROOF CLOTHING

TECHNICAL FIELD

The present invention relates to a waterproofed fabric which is suitable for use in sports clothes, rain wear, and so forth, and is comfortable to wear, a sealing tape for use with the waterproofed fabric, and a waterproof article of clothing using the same.

BACKGROUND ART

Referring to waterproofed fabrics, for example, U.S. Pat. No. 4,429,000 and DE02948892 each discloses a method of coating a polyurethane solution onto a fabric, the solution being prepared by dissolving a polyurethane resin into a water-soluble solvent, and wet-gelling the polyurethane resin. In these patent specifications, so-called moisture-permeable waterproof fabrics are disclosed. When water is substituted for the solvent, a porous polyurethane film is formed on the fabric. This film is impermeable to water such as rain water or the like, and is permeable to moisture (steam). The moisture-permeable waterproof fabric can be used to form a waterproof article of clothing.

However, the porous polyurethane film disclosed in U.S. Pat. No. 4,429,000 and DE02948892 has problems in that the polyurethane film becomes sticky to the touch once dew drops are generated on the surface of the porous film and inside thereof, that is, the film is remarkably uncomfortable to wear.

Moreover, there is a known method in which a hydrophilic resin is used to absorb drops of sweat. However, the fabric has defects in that once the fabric absorbs water, it is difficult to remove the water, and the resin surface becomes sticky to the touch.

To eliminate this uncomfortable feel when wearing, that is, the sticky touch and the tackiness, various methods are known, in which a so-called three layer structure containing a knitted fabric or the like bonded to the surface of the film is formed, and a liner is used, and so forth. However, these methods are expensive.

Referring to conventional sealing tapes for use with waterproofed fabrics, for example, a hot melt layer is laminated directly onto a waterproof resin layer. However, the sealing tape feels/unpleasant to the touch. To improve this unpleasant feel to the touch, for example, a fabric is laminated onto the other surface of the hot melt layer. However, the production process becomes more complicated, and the tape becomes expensive, due to the lamination of the fabric.

DISCLOSURE OF INVENTION

Accordingly, it is an object of the present invention to provide a novel waterproofed fabric which is waterproof, and moreover, is comfortable to wear, a sealing tape for use with the waterproofed fabric, and to provide a waterproof article of clothing using them, in which no liner is used, and which may have a two layer structure without need of providing a three layer structure, and is comfortable to wear.

As a result of the intensive investigation by the inventors, it has been found that a waterproofed fabric and a sealing tape for use with the waterproofed fabric, each having a low sliding friction at the surface and being comfortable to the touch, can be provided by lamination of a resin containing spherical particles onto a waterproof layer. Moreover, it has been found that the waterproof article of the present invention using the waterproofed fabric and the sealing tape of the present invention feels dry to the touch without sticky and tacky feel, even if the article does not have a three layer structure but a two layer structure, and no liner is used for the article.

That is, in the waterproofed fabric of the present invention, a waterproof layer is provided on one side of a fabric, and a resin composition is laminated to the waterproof layer, the resin composition containing 20 to 200 parts by weight of spherical particles with an average particle size of 5 to 200 μm dispersed in 100 parts by weight of the total-resin of the composition.

BEST MODE FOR CARRYING OUT THE INVENTION

As a fabric for use in the waterproofed fabric of the present invention, any fabric may be employed, provided that it is suitable for its uses and so forth. For example, synthetic fibers of polyester, nylon, or the like, semi-synthetic fibers of acetate or the like, and natural fibers such as cotton, hemp, and wool may be used singly or as a mixture of at least two of these fibers. The form of the fabric is not particularly limited. For example, woven fabrics, knitted fabrics, non-woven fabrics, and so forth may be used.

As a component for forming the waterproof layer, a resin is used. Examples of the resin include polyurethane resins of a polyester copolymer type, a polyether copolymer type, and a polycarbonate copolymer type, polyurethane resins copolymerized with silicone, fluorine, amino acids, or the like, acrylic resins, synthetic rubbers, vinyl resins such as polyvinylchloride, and so forth may be used. Preferably, the polyurethane resins are employed.

To make the waterproofed fabric of the present invention moisture-permeable, a moisture-permeable polyurethane resin is preferably used as the resin.

In preferred forms of the present invention, the waterproof layer is a micro-porous film made of a polyurethane resin, a non-porous film made of a polyurethane resin, or a laminate of the non-porous film made of the polyurethane resin and the micro-porous film made of the polyurethane resin. In this case, the polyurethane resins for the micro-porous film and the non-porous film may have the same composition or different compositions.

Preferred forms of the waterproof layer include the following films (1) and (2).

(1) A micro-porous film made of a polyurethane resin or containing a polyurethane resin as a major component.

(2) A non-porous film made of a moisture-permeable polyurethane resin or containing a moisture-permeable polyurethane resin.

In a preferred form, the non-porous film made of the moisture-permeable polyurethane resin is further laminated onto a micro-porous film such as the aforementioned film (1).

In the waterproofed fabric of the present invention, a resin composition containing 20 to 200 parts by weight of spherical particles with an average particle size of 5 to 200 μm dispersed in 100 parts by weight of the total resin of the composition is laminated onto the waterproof layer.

The resin in which the spherical particles are dispersed is not particularly limited. For example, polyurethane resins, acrylic resins, vinyl type resins, and so forth may be used. Preferably, the polyurethane resins are employed.

The particles to be dispersed are required to be spherical. The term "spherical particles" means that a particle having an acute angle such as a needle-like particle or a broken piece-shaped particle is not contained in the spherical particles. Specifically, the amount of particles each having a protuberance of which the size is larger than the diameter of the largest possible sphere which can be imaginarily contained in the particle is less than 5 percent by weight. If particles having acute angles are used, they cause a sticky touch, and the laminated resin composition is not smooth and dry to the touch.

Moreover, it is required that the average particle size is set to be in the range of from 5 µm to 200 µm, and the amount of the particles is set to be in the range of from 20 to 200 parts by weight based on 100 parts by weight of the total resin in which the particles are dispersed. If the average particle size is less than 5 µm, a dry touch cannot be obtained due to the excessively small size. On the other hand, if the size exceeds 200 µm, the touch of the laminated resin composition undesirably becomes considerably rough. Furthermore, if the amount of the particles is less than 20 parts by weight, a smooth touch cannot be obtained, due to the excessively small amount of particles. If the amount exceeds 200 parts by weight, undesirably, the effects of the added particles will peak out, and moreover, the particles will be released in remarkable amounts by laundering and so forth.

Preferably, the weight distribution of the spherical particles has at least two peaks. More preferably, at least two types of particles of which the weight distributions are substantially normal (each weight distribution has one peak) are mixed. When the spherical particles of which the weight distribution has at least two peaks are used, dispersion of the particles into the resin composition can be evenly achieved. As to the effects of the spherical particles, the resin composition becomes drier to the touch, due to the spherical particles having a relatively large particle size, while a reduction of the coefficient of friction is caused by the spherical particles having a relatively small particle size. Thus, a waterproofed fabric which is not rough to the touch, and is comfortable to wear can be obtained.

The composition of the spherical particles is not particularly limited. Preferably, the spherical particles are insoluble in or can be less swelled with solvents or water used in the process in which a resin for the waterproof layer is dissolved and coated and with solvents used in dry-cleaning. The spherical particles, if they are soluble in or are highly capable of being swelled with water, will be removed by sweat or during washing. Moreover, the spherical particles, if they are soluble in or are capable of being swelled with solvents such as dimethyl formamide and methyl ethyl ketone, which are generally used when the resin composition is made liquid, will be dissolved or swelled when the spherical particles are compounded with the resin. Thus, in some cases, the object of the present invention cannot be achieved. Furthermore, if the spherical particles are soluble in petroleum type solvents or other solvents such as perchloroethylene, the launderability of the fabric will be reduced.

Examples of compounds which are preferably used for the spherical particles include acrylic resins, resins mainly containing an acrylic component, polyethylene resins, polyproplylene resins, polyester resins, nylon resins, and so forth. Of these resins, the acrylic resins and resins mainly containing an acrylic component are especially preferable. These resins are characteristic in that they are superior in dispersability, the spherical particles made of these resins have no voids, and thus, have less danger of being broken, and the resins are highly transparent and have a high coloring property.

The method of dispersing the spherical particles in the resin is not particularly limited. By a preferable method, the spherical particles and the resin are mixed with each other using a solvent which is capable of dissolving the resin and moreover, is incapable of swelling the spherical particles. The solvent for the mixing is not particularly limited. Preferably, dimethyl formamide and methyl ethyl ketone are used.

The resin composition containing the spherical particles dispersed therein is laminated to the whole or a part of the surface of the waterproof layer. When the composition is laminated to the whole surface, the touch can be effectively improved, due to the presence of the spherical particles.

It is preferable to partially laminate the resin composition, depending on uses of the fabric. That is, in the case in which the resin composition is partially laminated and the waterproof layer is moisture-permeable, the fabric is comfortable to wear, due to the moisture-permeability. Moreover, advantageously, the fabric is inexpensive. From these standpoints, preferably, the resin composition is partially laminated in a dot, grated, or linear pattern. Most preferably, the composition is laminated in a dot and/or linear pattern.

Preferably, both of the average coefficients of friction (MIU) in the warp and weft directions of the surface of the laminated resin composition, measured by the KES method, are up to 0.8. By setting the MIU to be up to 0.8, the waterproofed fabric can be made comfortable to wear, due to the low frictional resistance. In addition, frictional damage to the surface of the waterproof layer, which reduces the waterproof property, can be prevented. More preferably, the average coefficients (MIU) are also maintained at up to 0.8 after laundering.

Preferably, the waterproofed fabric of the present invention has a water pressure resistance of 10 kPa or higher from the standpoint of a practically required waterproof property.

Also, the waterproofed fabric of the present invention preferably has a moisture permeability of 2,500 $g/m^2 \cdot hr$ or higher. By satisfying this moisture permeability requirement, the fabric can be made less damp when wearing. The moisture permeability in this patent specification is measured according to JIS Standard (Japanese Industrial Standard) L-1099, Method A-1. The moisture permeability, which is measured according to JIS standard L-1099, Method B-1, is preferably 4,000 $g/m^2 \cdot hr$ or higher.

Next, preferable forms of a method of producing the waterproofed fabric of the present invention will be described below.

A method of laminating the waterproof layer to a fabric is not particularly limited. For example, the following may be employed: the resin composition dissolved in a solvent is coated onto a fabric; and the waterproof layer, which is formed by coating or the like on release paper, is bonded to a fabric in a dot pattern or to the whole surface of a fabric by use of an adhesive, and then, the release paper is peeled away.

In particular, to produce the moisture-permeable waterproof layer as described above, the following methods (3) and (4) are preferably employed.

(3) A polyurethane solution, which is prepared by dissolving a polyurethane resin or a resin containing a Polyurethane resin as a major component in a water-soluble solvent, is coated onto a fabric and wet-gelled, whereby a micro-porous film which is moisture-permeable and also waterproof is obtained.

(4) A moisture-permeable polyurethane resin or a resin containing a moisture-permeable polyurethane resin is coated onto a fabric and dried, whereby a nonporous film which is moisture-permeable and also waterproof is obtained.

To laminate the waterproof layer, various methods such as knife-coating, knife-over-roll coating, reverse roll coating, and so forth may be applied.

To laminate the resin composition containing the spherical particles dispersed therein, for example, a coating method may be applied. Various coating methods such as gravure coating, knife coating, knife-over-roll coating, and reverse roll coating may be used. Of these coating methods, one using a-gravure coating system is most suitable to uniformly disperse the spherical particles.

If the design of the laminated resin composition is to be emphasized, needless to say, pigments or the like may be incorporated into the resin composition, the resin composition may be coated in a pattern, and multi-color, multi-step coating may be employed.

Hereinafter, the sealing tape for a waterproofed fabric in accordance with the present invention will be described.

The sealing tape for the waterproofed fabric of the present invention comprises a waterproof layer formed on one side of a fabric, a resin composition containing 20 to 200 parts by weight of spherical particles with an average particle size of 5 $\mu$m to 200 $\mu$m dispersed in 100 parts by weight of resin and laminated to the waterproof layer, and a hot melt layer laminated to the other side of the fabric.

In a preferred form of the sealing tape, the sealing tape comprises a waterproof layer, a resin composition containing 20 to 200 parts by weight of spherical particles with an average particle size of 5 $\mu$m to 200 $\mu$m dispersed in 100 parts by weight of a resin and laminated to one side of the waterproof layer, and a hot melt layer laminated to the other side of the waterproof layer.

In the sealing tape for the waterproofed fabric in accordance with the present invention, a fabric may be used for reinforcement or the like of the base material of the tape, if necessary. When a fabric is used for reinforcement of the base material, for example, synthetic fibers of polyester, nylon, and the like, semi-synthetic fibers of acetate and the like, and natural fibers of cotton, hemp, wool, and the like may be used singly or as a mixture of at least two kinds of them. No particular restrictions are imposed on the shape and size of the fabric. For example, woven fabrics, knitted fabrics, non-woven fabrics, and so forth may be used.

When a fabric is used as the base material, the strength of the sealing tape is enhanced. However, the feel becomes stiff to some degree. Thus, it is preferable to select a pliable fabric. Specifically, a fabric made of fibers with a size of up to 55 dtex is preferable. More preferably, a fabric made of fibers with a size of up to 44 dtex is used.

Most preferably, in the sealing tape for the waterproofed fabric, no fabric is used, a resin containing spherical particles dispersed therein is laminated to a waterproof layer, and a hot melt resin is laminated to the other side of the waterproof layer. In this case, the waterproof layer is made of a resin.

Examples of the resin for forming the waterproof layer include polyurethane resins of a polyester copolymer type, a polyether copolymer type, and a polycarbonate copolymer type, polyurethane resins copolymerized with silicone, fluorine, amino acids, or the like, polyester type resins, acrylic resins, synthetic rubbers, vinyl type resins such as polyvinylchloride, and so forth may be used. The polyurethane resins are preferable.

To make the sealing tape for the waterproofed fabric moisture-permeable according to the present invention, a moisture-permeable polyurethane resin is preferably used as the resin. A micro-porous film made of a polyurethane resin, a nonporous film made of a polyurethane resin, and a laminate of the micro-porous film made of the polyurethane resin and the nonporous film made of the polyurethane resin are preferable forms of the waterproof layer. In this case, the polyurethane resins for the micro-porous film and the nonporous film may have the same or different compositions.

Preferred forms of the waterproof layer include the following films (5) and (6).

(5) A micro-porous film made of a polyurethane resin or a resin containing the polyurethane resin as a major component.

(6) A nonporous film made of a moisture-permeable polyurethane resin or a resin containing the moisture-permeable polyurethane resin as a major component.

In addition, a laminate of the micro-porous film of Article (5) and the nonporous film made of the moisture-permeable polyurethane resin is a preferable form of the waterproof layer.

The sealing tape of the present invention contains a hot melt layer on one side thereof, and a resin having spherical particles dispersed therein laminated on the other side thereof.

No particular restrictions are imposed on the method of laminating the resin containing the spherical particles. For example, a resin composition containing particles dispersed therein may be coated onto the waterproof layer as in the case of the above-described waterproofed fabric.

The method of forming the waterproof layer is not particularly restricted. In the case where no fabric is used, a solution containing a resin for constituting the waterproof layer may be coated onto release paper or a release fabric, for example.

In the case where a fabric is used, for example, a method of coating a solution containing a resin for constituting the waterproof layer onto the fabric, and a method of forming the waterproof layer on release paper or the like by coating, bonding the waterproof layer to the fabric in a dot pattern or to the whole surface of the fabric by use of an adhesive, and removing the release paper, and so forth may be employed.

In particular, to form the moisture-permeable waterproof layer as described above, the following methods (7) and (8) are preferably employed.

(7) A polyurethane solution, which is prepared by dissolving a polyurethane resin or a resin containing the polyurethane resin as a major component in a water-soluble solvent, is coated onto a fabric and wet-gelled, whereby a micro-porous film which is moisture-permeable and waterproof is formed.

(8) A moisture-permeable polyurethane resin or a resin containing the moisture-permeable polyurethane resin is coated onto a fabric and dried, whereby a nonporous film which is moisture-permeable and waterproof is formed.

Referring to a method of laminating the waterproof layer, for example, various coating methods such as knife-coating, knife-over-roll coating, reverse roll coating, and so forth may be applied.

Referring to a method of laminating the resin composition containing the spherical particles dispersed therein, coating may be employed. Various coating methods such as gravure coating, knife coating, knife-over-roll coating, reverse roll coating, and so forth may be used. Of these methods, one using a gravure coating system is most suitable to uniformly disperse the spherical particles, and is most preferred.

When the design of the sealing tape is to be emphasized, needless to say, the following may be employed: pigments or the like may be incorporated into-the resin composition; the resin composition is coated in a pattern; and multi-color, multi-step coating is carried out.

Moreover, the sealing tape for the waterproofed fabric in accordance with the present invention contains the hot melt layer which is on the opposite side to the tape where the resin composition containing the spherical particles dispersed therein is laminated as described above.

No particular restrictions are imposed on the resin for forming the hot melt layer. A urethane resin is preferable from the standpoint of pliability, adhesive property, processability, and cost.

The sealing tape for the waterproofed fabric, when it is applied, is placed over a seam of the waterproofed fabric, and the hot melt layer is heat-melted. By using the sealing tape of the present invention, the waterproof property of the seam can be ensured.

No particular restrictions are imposed on the method of forming the hot melt layer. For example, the following method may be employed. A hot melt resin (for example, polyester type polyurethane, flow-start point of 100° C.) is previously heated to a temperature higher than the flow-start point to be fluidized, and, the fluidized hot melt resin is applied onto release paper EV130TPD (manufactured by Lintech Corporation) by means of a knife-over-roll coating machine to form a hot melt film with a thickness of 100 μM.

In the case where a fabric is used in the sealing tape for use with the waterproofed fabric according to the present invention, the following method may be employed, but is not restrictive. The hot melt film is overlaid on and laminated to the surface of the fabric at a temperature of 120° C., a linear pressure of 30 N/cm, and a velocity of 20 m/minute by means of a hot laminating machine. After cooling, the release paper is peeled away to obtain a sealing tape sheet useful for the waterproofed fabric. Subsequently, the sheet is cut so as to have a desired width by means of a slit cutter.

A waterproof article of clothing in accordance with the present invention uses the waterproofed fabric of the present invention and/or the sealing tape for the waterproofed fabric of the present invention.

In another waterproof article of clothing in accordance with the present invention, the sealing tape for the waterproofed fabric is melted and bonded so as to cover a seam of the waterproofed fabric.

Hereinafter, the present invention will be described in more detail with reference to examples. The respective properties described in the examples were determined as follows.

(A) Water Pressure Resistance

The water pressure resistance is measured according to JIS Standard L-1092.

For samples having large elongation ratios, various types of white cloth having nylon attached thereto, which are used for measurement of color fastness and specified by the JIS Standard, are overlaid on the samples and measured.

(B) Moisture Permeability

The moisture permeability is measured according to JIS Standard L-1099 (A-1 and B-1)

(C) Average Frictional Coefficient (MIU) by the KES Method

C-1 Evaluation of Film Surface

The film surface is measured by means of KES-FB4 manufactured by KATO TECH Co. A sample with a size of 20 cm×20 cm, provided with yarns passed therethrough, is placed on the smooth surface of a metal. A contacting device is placed on the film surface of the sample under pressure of a load of 50 gf. The device comprises ten piano wires with a diameter of 0.5 mm arranged perpendicularly to the direction in which the sample is to be moved, and has a friction surface size of 5 mm×5 mm. The friction resistance of the sample is measured as follows. A uniaxial tension of 19.6 cN/cm is applied to the sample so that the sample is horizontally moved a distance of 2 cm at a velocity of 0.1 cm/sec. The average friction coefficient (MIU) is calculated using the measured friction resistance. The MIU can be determined according to the equation described later (in Clause C-2).

C-2 Evaluation of Sealing Tape

A sample is prepared by bonding the sealing tape to the film surface of a urethane coated article with a size of 20 cm×20 cm at 160° C. by means of an iron. The contacting device is placed on the surface of the sealing tape under pressure of a load of 50 gf. The MIU is determined in a manner similar to that in Clause C-1.

$$MIU=(1/X)\int_0^x \mu dx$$

in which $\mu$ is a frictional force/a pressing force against a sample (50 gf), x is a movement distance (2 cm), and $\int_0^x$ is an integral function (0 is a starting position, and x is an end position).

(D) Touch

For evaluation of the touch of a sample, the flat of a person's hand, the back of the hand, and the skin of the, upper arm are made to touch the surface of the sample. The evaluation results are expressed as follows.

very good: dry to the touch with no tackiness good: dry to the touch almost without tackiness poor: slightly tacky to the touch very poor: tacky to the touch Samples which are assessed as "very good" and "good" are acceptable.

(E) Launderability

The launderability is evaluated according to JIS Standard L-0217, Method (Number) 103.

EXAMPLE 1

A nylon taffeta fabric made of 77 dtex nylon filament yarns was dipped in an aq. dispersion liquid containing 3% by weight of ASAHI GUARD AG710 (manufactured by MEISEI CHEMICAL WORKS. LTD.), which is a fluorine-type water repellent, picked up at a pickup of 40%, and dried and heat-treated at 130° C. for 30 seconds by means of a heat setting machine.

Subsequently, a polyurethane solution having a composition of Formula 1 described later was applied at a ratio of 130 g/m² by means of a knife-over-roll coating machine, and dipped in a bath of an aq. solution containing 10% by weight of dimethyl formamide at 30° C. for 3 minutes, so that the polyurethane coating solution was wet-coagulated. Then, the taffeta fabric sample was rinsed with hot water at 80° C. for 10 minutes, and dried with hot air at 140° C. Thus, a micro-porous film product (a fabric having a waterproof layer) was obtained.

Subsequently, a polyurethane solution having the composition of Formula 2 described below was applied on the micro-porous film by means of a gravure coating machine (32 mesh, an open free area of 50%), dried with hot air at 80° C., and further heat-treated at 160° C. for 3 minutes. Thus, a waterproofed fabric according to the present invention having the resin layer containing the spherical particles and laminated on one side of the fabric was obtained. The water pressure resistance and the moisture permeability of the obtained fabric and the average frictional coefficient (MIU) of the film surface were measured. The feel of the fabric was evaluated by touch (initial and after 10 times of laundering). Table 1 shows the results.

(Formula 1)

CRISVON 8166: 100 parts by weight (manufactured by Dainippon Ink & Chemicals, Incorporated., polyester type polyurethane)

BURNOCK D 500: 1 part by weight (manufactured by Dainippon Ink & Chemicals, Incorporated., block isocyanate) SYLISIA # 350: 5 parts by weight (manufactured by Fuji-Davison Chemical Ltd., porous silica gel) dimethyl formamide: 50 parts by weight (Formula 2)

HI-MUREN Y-262: 100 parts by weight (manufactured by Dainichiseika Color & Chemicals Mfg. Co., Ltd., polyether type polyurethane, moisture permeability (A-1) at a thickness of 12 μm of 5,500 g/m$^2$·hr)
crosslinked acrylic particles A: 15 parts by weight (average particle size of 28 μm, particle size of 5 to 50 μm)
crosslinked acrylic particles B: 15 parts by weight (average particle size of 40 μm, particle size of 10 to 80 μm)
methyl ethyl ketone: 75 parts by weight
toluene: 75 parts by weight

EXAMPLE 2

A polyurethane solution having the composition of Formula 3 described below was applied to the micro-porous film obtained according to the same formula as that in Example 1 by means of a knife-over-roll coating machine with a clearance of 50 μm, and dried with hot air at 80° C., so that a waterproofed film product (the fabric having the waterproof layer) containing the non-porous film laminated to the micro-porous film was obtained.

Subsequently, the polyurethane solution having the composition of the aforementioned Formula 2 was coated onto the non-porous film by means of a gravure coating machine (32 mesh, an open free area of 50%), dried with hot air at 80° C., and further heat-treated at 160° C. for 3 minutes. Thus, a waterproofed fabric according to the present invention having the resin layer containing the spherical particles and laminated on one side of the fabric was obtained. The water pressure resistance and the average coefficient of friction (MIU) of the surface of the obtained fabric were measured. The feel of the fabric was evaluated by touch (initial and after 10 times of laundering). Table 1 shows the results.

(Formula 3)

HI-MUREN Y-262: 100 parts by weight (manufactured by Dainichiseika Color & Chemicals Mfg. Co., Ltd., polyether type polyurethane, moisture permeability (A-1) at a thickness of 12 μm of 5,500 g/m$^2$·hr)
methyl ethyl ketone: 25 parts by weight
toluene: 25 parts by weight

EXAMPLE 3

A nylon taffeta fabric as a base fabric was water-repellent-finished using the same formula as described in Example 1.

Subsequently, a polyurethane solution having the composition of Formula 4 was applied by means of a knife-over-roll coating machine at a clearance of 200 μm, and dried with hot air at 80° C. Thereafter, the polyurethane solution having the composition of Formula 3 was applied using a clearance of 5 μm by means of a knife-over-roll coating machine, and dried with hot air at 80° C. Thus, a nonporous film-containing, moisture-permeable waterproofed product was obtained.

Subsequently, the polyurethane solution having the composition of Formula 2 was applied onto the non-porous film by means of a gravure coating machine (32 mesh, an open free area of 50%), dried with hot air at 80° C., and further heat-treated at 160° C. for 3 minutes. Thus, a waterproofed fabric having the resin layer containing the spherical particles formed on one side of the fabric according to the present invention was obtained. The water pressure resistance and the average coefficient of friction (MIU) of the surface of the obtained fabric were measured. The feel of the fabric was evaluated by touch (initial and after 10 times of laundering). Table 1 shows the results.

(Formula 4)

HI-MURENE Y-265: 100 parts by weight (manufactured by Dainichseika Color & Chemicals MFG. Co., Ltd., polyether type polyurethane, a moisture permeability (A-1) at a thickness of 12 μm of 6,300 g/m$^2$·hr)
RESAMINE X-100 crosslinking agent: 1 part by weight (manufactured by Dainichseika Color & Chemicals MFG. Co., Ltd., isocyanate type crosslinking agent)
methyl ethyl ketone: 25 parts by weight
toluene: 25 parts by weight

EXAMPLE 4

A polyester-taffeta fabric made of 83 dtex polyester filament yarns was water-repellent-finished by use of a fluorine type water-repellent. Specifically, the taffeta fabric was dipped in an aq. dispersion containing 3% by weight of ASAHI GUARD AG710 (manufactured by MEISEI CHEMICAL WORKS, LTD.), which is a fluorine-type water repellent, picked up at a pickup of 40%, and dried and heat-treated at 130° C. for 30 seconds by means of a heat setting machine. Thus, a release fabric was formed.

A polyurethane solution having the composition of Formula 1 was applied onto the release fabric at a coating amount of 130 g/m$^2$ by means of a knife-over-roll coating machine, and dipped in a bath of an aq. solution containing 10% by weight of dimethyl formamide as a coagulating liquid at 30° C. for 3 minutes, so that the polyurethane coating liquid was wet-coagulated. Then, the coated, coagulated polyurethane was rinsed with hot water at a temperature of 80° C. for 10 minutes, and dried with hot air at 140° C. Thus, a micro-porous film waterproof layer was formed on the release fabric.

Next, the polyurethane solution having the composition of Formula 2 was applied on the micro-porous film by means of a gravure coating machine (32 mesh, an open free area of 50%), dried with hot air at 80° C., and further heat-treated at 160° C. for 3 minutes. Thus, the waterproof layer having the resin layer containing the spherical particles and laminated on one side of the fabric was obtained.

Next, a polyurethane hot melt solution having the composition of Formula 5 and previously heated at a temperature higher than the flow-start point to be fluidized was applied onto release paper EV130TPD (manufactured by Lintech Corporation) by means of a knife-over-roll coating machine to form a hot melt layer with a thickness of 100 μm.

Moreover, the aforementioned waterproof layer was released from the release fabric. The release surface of the waterproof layer was overlaid on the hot melt layer and laminated thereto at a temperature of 120° C., a linear pressure of 30 N/cm, and a velocity of 20 m/minute by means of a hot laminating machine. After cooling, the release paper was peeled away. Thus, a sealing tape sheet for the waterproofed fabric was obtained. Subsequently, the sheet was cut to a width of 2.5 cm by means of a slit cutter to obtain a sealing tape. The water pressure resistance and the average coefficient of friction (MIU) of the surface of the sealing tape sheet before the cutting were measured. The feel of the sheet was evaluated by touch (initial and after 10 times of laundering). Table 1 shows the results.

(Formula 5)

A hot melt resin 100 parts by weight (polyester type polyurethane, a flow-start point of 100° C.)

EXAMPLE 5

The polyurethane solution having the composition of Formula 4 was applied onto a micro-porous film waterproof layer on a release fabric, obtained using the same formula as described in Example 4, by means of a knife-over-roll coating machine at a clearance 50 µm, and then dried with hot air at 80° C. Thus, a waterproof layer in which the non-porous film was laminated to the micro-porous film was obtained.

Subsequently, a polyurethane solution having the composition of the aforementioned Formula 2 was applied on the non-porous film by means of a gravure coating machine (32 mesh, an open free of 50%), dried with hot air at 80° C., and further heat-treated at 160° C. for 3 minutes. Thus, the waterproof layer having the resin layer containing the spherical particles and laminated to one side thereof was obtained.

Then, a hot melt layer was formed on the other surface of the waterproof layer in a manner similar to that in Example 4. Thereafter, the waterproof layer was peeled away from the release fabric. The release surface of the waterproof layer was laminated to the hot melt layer in a manner similar to that in Example 4. Thus, a sealing tape sheet for the waterproofed fabric was obtained.

Thereafter, the sheet was cut to a width of 2.5 cm by means of a slit cutter to obtain a sealing tape for the waterproofed fabric. The water pressure resistance and the average coefficient of friction (MIU) of the surface of the sealing tape sheet before the cutting were measured. The feel of the sheet was evaluated by touch (initial and after 10 times of laundering). Table 1 shows the results.

EXAMPLE 6

A polyurethane solution having the composition of the aforementioned Formula 4 was applied onto release paper EV130TPD (manufactured by Lintech Corporation) by means of a knife-over-roll coating machine at a clearance of 200 µm, and then dried with hot air at a temperature of 80° C. Furthermore, a polyurethane solution having the composition of the aforementioned Formula 3 was applied thereon by means of a knife-over-roll coating machine to a thickness of 50 µm, and dried with hot air at a temperature of 80° C. Thus, a non-porous, waterproof layer was formed on the release paper.

Next, a polyurethane solution having the composition of the aforementioned Formula 2 was applied on the non-porous, waterproof film by means of a gravure coating machine (32 mesh, an open free area of 50%), dried with hot air at 80° C., and further heat-treated at 160° C. for 3 minutes. Thus, the waterproof layer having the resin layer containing the spherical particles and laminated on one side thereof was obtained.

Next, a hot melt layer was laminated in a manner similar to that in Example 4. Subsequently, the waterproof layer was removed from the release fabric. The release surface of the waterproof layer was laminated to the hot melt layer in a manner similar to that in Example 4. Thus, a sealing tape sheet for the waterproofed fabric was obtained.

Subsequently, the sheet was cut to a width of 2.5 cm by means of a slit cutter to obtain a sealing tape for the waterproofed fabric.

The water pressure resistance and the average coefficient of friction (MIU) of the surface of the sealing tape sheet before the cutting were measured. The feel of the sheet was evaluated by touch (initial and after 10 times of laundering). Table 1 shows the results.

EXAMPLE 7

A nylon taffeta fabric made of 33 dtex nylon filament yarns was water-repellent-finished by use of a fluorine type water repellent. Specifically, the taffeta fabric was dipped in an aq. dispersion containing 3% by weight of Asahi Guard AG 710 (manufactured by MEISEI CHEMICAL WORKS, LTD.), picked up at a pickup of 40%, and dried and heat-treated at 130° C. for 30 seconds by means of a heat setting machine.

Next, a polyurethane solution having the composition of the aforementioned Formula 1 was applied at a coating amount of 130 g/m by means of a knife-over-roll coating machine, dipped in a bath of an aq. solution containing 10% by weight of dimethyl formamide at 30° C. for 3 minutes, so that the polyurethane coating liquid was wet-coagulated. Then, the taffeta fabric was rinsed with hot water at 80° C. for 10 minutes, and dried at 140° C. with hot air. Thus, a micro-porous film product was obtained.

Next, a polyurethane solution having the composition of the aforementioned Formula 2 was applied on the micro-porous film by means of a gravure coating machine (32 mesh, an open free area of 50%), dried with hot air at 80° C., and further heat-treated at 160° C. for 3 minutes. Thus, a micro-porous film product having the resin layer containing spherical Particles and laminated on one side thereof was obtained.

Subsequently, a hot melt layer was laminated to the fabric surface of the micro-porous film product in a manner similar to that in Example 4. The lamination conditions for the hot laminating machine were a temperature of 120° C., a linear pressure of 30 N/cm, and a velocity of 20 m/minute. After cooling, the release paper was peeled away. Thus, a sealing tape sheet for the waterproofed fabric was obtained.

Next, the sheet was cut to a width of 2.5 cm by means of a slit cutter to obtain a sealing tape for the waterproofed fabric.

The water pressure resistance and the average coefficient of friction (MIU) of the surface of the sealing tape sheet before the cutting were measured. The feel of the sheet was evaluated by touch (initial and after 10 times of laundering). Table 1 shows the results.

EXAMPLE 8

A waterproof article of clothing was produced by sewing the waterproofed fabric obtained in Example 1 using no lining cloth. In this case, the sealing tape obtained in Example 4 was placed over a seam of the fabric, and was melt-bonded thereto so that the seam was sealed.

The article of clothing was comfortable to wear, although no back cloth was used in the article. No reduction of the waterproof property, which might be caused by wearing-abrasion of the film surface, was observed. Moreover, no reduction of the waterproof property was caused by laundering, and also, no leakage of water was observed, when the article of clothing was worn in rainy weather.

COMPARATIVE EXAMPLE 1

A micro-porous film was formed on a nylon taffeta base fabric, using the same formula as employed in Example 1, and heat-treated at 160° C. for 3 minutes. Thus, a moisture-permeable, waterproofed fabric was obtained. The water pressure resistance and the average coefficient of friction (MIU) of the surface of the obtained fabric were measured. The feel of the fabric was evaluated by touch (initial and after 10 times of laundering). Table 1 shows the results. For the fabric of this comparative example, in which the resin composition containing the spherical particles was not laminated onto the waterproof layer, the MIU was large, and the feel was inferior.

COMPARATIVE EXAMPLE 2

A polyurethane solution having the composition of Formula 6 described below was applied on the micro-porous film product using the same composition as employed in Example 1 by means of a gravure coating machine (32 mesh, an open free area of 50%), dried with hot air at 80° C., and further heat-treated at 160° C. for 3 minutes. Thus, a waterproofed, moisture-permeable fabric was obtained. The water pressure resistance of the obtained fabric and the average frictional coefficient (MIU) of the surface thereof were measured. The feel of the fabric was evaluated by touch (initial and after 10 times of laundering).

Table 1 shows the results. For the fabric of this comparative example, in which only the resin, not containing spherical particles dispersed therein, was laminated onto the waterproof layer, the MIU was large, and the feel was inferior.

(Formula 6)

HI-MUREN Y-262: 100 parts by weight (manufactured by Dainichiseika Color & Chemicals Mfg. Co., Ltd., polyether type polyurethane)
methyl ethyl ketone: 75 parts by weight
toluene: 75 parts by weight

COMPARATIVE EXAMPLE 3

The waterproof film product having the non-porous film laminated onto the micro-porous film was obtained in the same manner as described in Example 2. This waterproof film product was heat-treated at 160° C. for 3 minutes. Thus, a moisture-permeable waterproofed fabric was obtained. The water pressure resistance of the obtained fabric and the average frictional coefficient (MIU) of the surface thereof were measured. The feel of the fabric was evaluated by touch (initial and after 10 times of laundering).

Table 1 shows the results. For the fabric of this comparative example, in which the resin composition containing the spherical particles dispersed therein was not laminated to the waterproof layer, the MIU was large, and the feel was inferior.

COMPARATIVE EXAMPLE 4

A triol solution containing 15% by weight of an acrylic ester copolymer and 3% by weight of a trimethylol propane—hexamethylene diisocyanate adduct (molar ratio of 1:3) was applied onto a nylon taffeta fabric made of 77 dtex nylon filament yarns water-repellent-finished in the same manner as described in Example 1 by means of a knife-over-roll coating machine. The coated taffeta fabric was dried (the solvent was removed), and thereafter, heat-treated at 160° C. for 3 minutes. Thus, a waterproofed fabric was obtained. The water pressure resistance and the mean frictional coefficient (MIU) of the surface of the obtained fabric were measured. The feel of the fabric was evaluated by touch (initial and after 10 times of laundering).

Table 1 shows the results. For the waterproofed fabric of this comparative example, in which the resin composition Containing the spherical particles dispersed therein was not laminated to the waterproof layer, the MIU was large, and the feel was inferior. Moreover, the water-pressure resistance and the moisture permeability were low.

COMPARATIVE EXAMPLE 5

A micro-porous film was prepared in the same manner as described in Example 4, and was further heat-treated at 160° C. for 32 minutes. Thus, a micro-porous waterproof film having the release fabric was obtained.

Thereafter, a hot melt layer was laminated thereto in a manner similar to that in Example 4. That is, the waterproof surface of the micro-porous, waterproof film formed on the above-described release fabric and the hot melt film were laminated to each other in the same manner as described in Example 4. The release fabric was peeled away. Thus, a sealing tape sheet for the waterproofed fabric was obtained.

Subsequently, the sheet was cut to-a width of 2.5 cm by means of a slit cutter to obtain a sealing tape for the waterproofed fabric.

The water pressure resistance and the average frictional coefficient (MIU) of the surface of the sealing tape sheet before the cutting were measured. The feel of the sheet was evaluated by touch (initial and after 10 times of laundering).

Table 1 shows the results. For the sealing tape of this comparative example, in which the resin composition containing the spherical particles was not laminated to the one side of the waterproof layer, the MIU was large, and the feel was inferior.

COMPRATIVE EXAMPLE 6

A micro-porous waterproof film product having a release fabric was obtained in the same manner as employed in Example 4. A polyurethane solution having the aforementioned composition of Formula 6 was applied on the micro-porous film by means of a gravure coating machine (32 mesh, an open free area of 50%), dried with hot air at 80° C., and further heat-treated at 160° C. for 3 minutes. Thus, a waterproofed fabric was obtained.

Thereafter, a hot melt layer was laminated thereto in a manner similar-to that in Example 4. That is, the fabric-side surface of the waterproof film and the hot melt layer were laminated to each other in the same manner as described in Example 4. Thus, a sealing tape sheet for the waterproofed fabric was obtained.

Subsequently, the sheet was cut to a width of 2.5 cm by means of a slit cutter to obtain a sealing tape for the waterproofed fabric.

The water pressure resistance and the average frictional coefficient (MIU) of the sealing tape sheet before the cutting were measured. The feel of the sheet was evaluated by touch (initial and after 10 times of laundering).

Table 1 shows the results. For the sealing tape of this comparative example, in which only the resin not containing the spherical particles dispersed therein was laminated to the waterproof layer, the MIU was large, and the feel was inferior.

COMPARATIVE EXAMPLE 7

A hot melt layer was laminated, in the same manner as in Example 4, to the waterproof layer which was released from the waterproof film product comprising the non-porous film laminated to the micro-porous film having the release fabric, obtained in the same manner as that in Example 5. Thus, a sealing tape sheet for the waterproofed fabric was obtained.

Thereafter, the sheet was cut to a width of 2.5 cm by means of a slit cutter to obtain a sealing tape for the waterproofed fabric.

The water pressure resistance and the average frictional coefficient (MIU) of the sealing tape sheet before the cutting were measured. The feel of the sheet was evaluated by touch (initial and after 10 times laundering). Table 1 shows the results. For the sealing tape of this comparative example, in which the resin composition having the spherical particles dispersed therein is not laminated to the one side of the waterproof layer, the MIU was large, and the feel was inferior.

COMPRARATIVE EXAMPLE 8

A triol solution containing 15% by weight of an acrylic ester copolymer and 3% by weight of a trimethylol propane—hexamethylene diisocyanate adduct (a molar ratio of 1:3) was applied onto release paper at a coating amount of 200 g/m² by means of a knife-over-roll coating machine, and dried (the solvent was removed). Thus, a non-porous, waterproof film product was obtained.

Hereinafter, the non-porous, waterproof film was released from the release paper. The hot melt layer was laminated to the release surface in the same manner as in Example 4. Thus, a sealing tape sheet for the waterproofed fabric was obtained.

Next, the sheet was cut to a width of 2.5 cm by means of a slit cutter to obtain a sealing tape for the waterproofed fabric.

The water pressure resistance and the average frictional coefficient (MIU) of the sealing tape sheet before the cutting were measured. The feel of the sheet was evaluated by touch (initial and after 10 times of laundering).

Table 1 shows the results. For the sealing tape of this comparative example, in which the resin composition containing the spherical particles was not laminated to the one side of the waterproof layer, the MIU was large, and the feel was inferior.

COMPARATIVE EXAMPLE 9

The waterproofed fabric obtained in Comparative Example 1 was sewed in a water-tight manner. The sealing tape obtained in Comparative Example 5 was placed over the seam and melt-bonded for sealing by means of a taping machine.

This waterproof article of clothing of this comparative example, in which the resin composition having the spherical particles dispersed therein was not laminated to the waterproof layer, was tacky or sticky to the touch, and was uncomfortable to wear. Furthermore, the waterproof property of the article of clothing was reduced, due to wearing abrasion. Leakage of water was observed when the article was worn in rainy weather.

TABLE 1

| | Presence or absence of resin composition laminated to water-proof layer | Presence or absence of spherical particles in resin composition | Average frictional coefficient (MIU) | | | | Touch | | Water pressure resistance (kPa) | | moisture permeability (g/m² · hr) | |
| --- | --- | --- | --- | --- | --- | --- | --- | --- | --- | --- | --- | --- |
| | | | not laundering | | after 10 times laundering | | not laundering | after 10 times laundering | not laundering | after 10 times laundering | not laundering | |
| | | | warpwise | weftwise | warpwise | weftwise | | | | | A-1 | B-1 |
| Example 1 | laminated | contained | 0.31 | 0.30 | 0.52 | 0.51 | very good | very good to good | 80 | 70 | 8,000 | 10,000 |
| Example 2 | laminated | contained | 0.33 | 0.32 | 0.50 | 0.53 | very good | very good to good | 200 | 180 | 6,000 | 9,000 |
| Example 3 | laminated | contained | 0.32 | 0.29 | 0.52 | 0.48 | very good | very good to good | 200 | 180 | 3,000 | 12,000 |
| Example 4 | laminated | contained | 0.31 | — | 0.35 | — | very good | very good to good | 80 | 70 | 6,500 | 8,000 |
| Example 5 | laminated | contained | 0.32 | — | 0.35 | — | very good | very good to good | 200 | 180 | 4,800 | 7,000 |
| Example 6 | laminated | contained | 0.32 | — | 0.34 | — | very good | very good to good | 200 | 180 | 2,800 | 10,500 |
| Example 7 | laminated | contained | 0.31 | — | 0.35 | — | very good | very good to good | 80 | 70 | 7,500 | 9,500 |
| Comparative example 1 | not laminated | — | 0.91 | 1.00 | 1.22 | 1.44 | poor to very poor | poor to very poor | 80 | 70 | 8,000 | 10,000 |
| Comparative example 2 | laminated | not contained | 0.81 | 0.88 | 0.91 | 0.98 | poor to very poor | poor to very poor | 80 | 70 | 8,000 | 10,000 |
| Comparative example 3 | not laminated | — | 0.93 | 1.12 | 1.31 | 1.45 | very poor | very poor | 200 | 180 | 6,000 | 9,000 |
| Comparative example 4 | not laminated | — | 1.25 | 1.20 | 1.31 | 1.28 | very poor | very poor | 9 | 6 | 1,200 | 2,300 |
| Comparative example 5 | not laminated | — | 0.96 | — | 1.13 | — | very poor | very poor | 80 | 70 | 6,800 | 7,500 |
| Comparative example 6 | laminated | not contained | 0.84 | — | 0.91 | — | poor to very poor | very poor | 80 | 70 | 6,500 | 8,000 |
| Comparative example 7 | not laminated | — | 0.93 | — | 1.21 | — | very poor | very poor | 200 | 180 | 5,300 | 7,500 |
| Comparative example 8 | not laminated | — | 1.28 | — | 1.35 | — | very poor | very poor | 200 | 180 | 500 | 1,200 |

Industrial Applicability

According to the present invention, a waterproofed fabric and a sealing tape for the waterproofed fabric, each of which has a reduced coefficient of sliding friction, is comfortable to wear and less tacky, that is, dry to the touch, can be obtained. Moreover, a waterproof article of clothing using the fabric and the tape, which requires no back cloth, can be provided.

According to the present invention, a waterproof article of clothing can be provided which is not tacky to the touch and is comfortable to wear. For the article of clothing, it does not require a knitted fabric or the like to be bonded with an adhesive. That is, a three layer structure is not required for the article. The article of clothing is inexpensive and light in weight, and can be compactly folded.

In addition, the overall waterproof property of the article of clothing having seams can be enhanced by use of the sealing tape for the waterproofed fabric of the present invention.

Moreover, the patterns on the surfaces of the waterproof layers of the fabric and the sealing tape can be harmonized with each other. Thus, a waterproof article of clothing which is superior in design can be provided.

What is claimed is:

1. A waterproofed fabric comprising a base fabric, a waterproof layer on one side of the base fabric, and a resin composition laminated onto the waterproof layer, the resin composition comprising 100 parts by weight of resin and 20 to 200 parts by weight of spherical particles with an average particle size of 5 µm to 200 µm dispersed in the resin.

2. A waterproofed fabric according to claim 1, wherein the resin composition is laminated in a dot pattern and/or a linear pattern.

3. A waterproofed fabric according to claim 1, wherein the fabric has a water pressure resistance of at least 10 kPa.

4. A waterproofed fabric according to claim 1, wherein the laminated resin composition has an average coefficient (MIU) of friction at the surface in the warp and weft directions of up to 0.8 by measurement according to the KES method.

5. A waterproofed fabric according to claim 1, wherein the waterproof layer comprises one of a micro-porous film made of a polyurethane resin, a non-porous film made of a polyurethane resin, and a laminate of the nonporous film made of the polyurethane resin and the micro-porous film made of the polyurethane resin.

6. A waterproofed fabric according to claim 1, wherein the fabric has a moisture permeability of at least 2.500 g/m²·hr.

7. A waterproofed fabric according to claim 1, wherein the resin is a moisture-permeable polyurethane resin.

8. A waterproofed fabric according to claim 1, wherein the spherical particles are made of an acrylic resin.

9. A waterproofed fabric according to claim 1, wherein the spherical particles have a weight distribution having at least two peaks.

10. A sealing tape for a waterproofed fabric comprising a base fabric, a waterproof layer formed on one side of the base fabric, and a resin composition laminated onto the waterproof layer, the resin composition comprising 100 parts by weight of resin and 20 to 200 parts by weight of spherical particles with an average particle size of 5 µm to 200 µm dispersed in the resin and a hot melt layer laminated to the other side of the base fabric.

11. A sealing tape for a waterproofed fabric comprising a waterproof layer, a resin composition laminated onto one side of the waterproof layer, the resin composition comprising 100 parts by weight of resin and 20 to 200 parts by weight of spherical particles with an average particle size of 5 µm to 200 µm dispersed in the resin and a hot melt layer laminated to the other side of the waterproof layer.

12. A sealing tape for a waterproofed fabric according to claim 10 or 11, wherein the hot melt layer is made of a polyurethane resin.

13. A sealing tape for a waterproofed fabric according to claim 10 or 11, wherein the resin composition is laminated in a dot pattern and/or a linear pattern.

14. A sealing tape for a waterproofed fabric according to claim 10 or 11, wherein the tape has a water pressure resistance of at least 10 kPa.

15. A sealing tape for a waterproofed fabric according to claim 10 or 11, wherein the laminated resin composition has an average coefficient of friction (MIU) in the warp direction at the surface of up to 0.8 by measurement according to the KES method.

16. A sealing tape for a waterproofed fabric according to claim 10 or 11, wherein the laminated resin composition has average coefficients of friction (MIU) in the warp and weft directions at the surface of up to 0.8 by measurement according to the KES method.

17. A sealing tape for a waterproofed fabric according to claim 10 or 11, wherein the waterproof layer comprises one of a micro-porous film made of a polyurethane resin, a nonporous film made of a polyurethane resin, and a laminate of the nonporous film made of the polyurethane resin and the micro-porous film made of the polyurethane resin.

18. A sealing tape for a waterproofed fabric according to claim 10 or 11, wherein the resin is a moisture-permeable polyurethane resin.

19. A sealing tape for a waterproofed fabric according to claim 10 or 11, wherein the spherical particles are made of an acrylic resin.

20. A sealing tape for a waterproofed fabric according to claim 10 or 11, wherein the spherical particles have a weight distribution having at least two peaks.

21. A waterproof article of clothing comprising:
at least one waterproofed fabric comprising a base fabric, a waterproof layer on one side of the base fabric, and a resin composition laminated onto the waterproof layer, the resin composition comprising 100 parts by weight of resin and 20 to 200 parts by weight of spherical particles with an average particle size of 5 µm to 200 µm dispersed in the resin and
the sealing tape for a waterproofed fabric defined in claim 10.

22. A waterproof article of clothing using the sealing tape for a waterproofed fabric defined in claim 11.

23. A waterproof article of clothing comprising:
a waterproofed fabric comprising a base fabric, a waterproof layer on one side of the base fabric, and a resin composition laminated onto the waterproof layer, the resin composition comprising 100 parts by weight of resin and 20 to 200 parts by weight of spherical particles with an average particle size of 5 µm to 200 µm dispersed in the resin or
the sealing tape for a waterproofed fabric defined in claim 11.

24. A waterproof article of clothing comprising:
a sealing tape for a waterproofed fabric comprising a base fabric, a waterproof layer on one side of the base fabric, and a resin composition laminated onto the waterproof layer, the resin composition comprising 100 parts by weight of resin and 20 to 200 parts by weight of spherical particles with an average particle size of 5 µm to 200 µm dispersed in the resin and
the sealing tape for a waterproofed fabric defined in claim 11.

25. A waterproof article of clothing comprising:
at least one sealing tape for a waterproofed fabric a base fabric, a waterproof layer formed on one side of the base fabric, and a resin composition laminated onto the waterproof layer, the resin composition comprising 100 parts by weight of resin and 20 to 200 parts by weight of spherical particles with an average particle size of 5 µm to 200 µm dispersed in the resin and a hot melt layer laminated to the other side of the base fabric and
the sealing take for a waterproofed fabric defined in claim 11, wherein the sealing tape is melt-bonded over a seam of the waterproof article.

* * * * *